United States Patent [19]
Kahl et al.

[11] Patent Number: 5,386,907
[45] Date of Patent: Feb. 7, 1995

[54] CONTAINER HAVING PIVOTAL COMPARTMENT

[75] Inventors: W. Henry Kahl, Wooster; John Koenig, Columbus, both of Ohio

[73] Assignee: Rubbermaid Specialty Products Inc., Wooster, Ohio

[21] Appl. No.: 92,982

[22] Filed: Jun. 28, 1993

[51] Int. Cl.⁶ .................................................. B65D 85/00
[52] U.S. Cl. ................................. 206/315.11; 206/372; 206/373; 220/523; 220/521
[58] Field of Search ............ 206/315.11, 372, 373, 206/581, 542, 544, 545; 220/521, 522, 523, 524, 525, 526; 190/109, 111

[56] References Cited

U.S. PATENT DOCUMENTS

| | | | |
|---|---|---|---|
| D. 128,266 | 8/1950 | Belokin | D87/1 |
| D. 158,368 | 5/1950 | Felts et al. | D58/12.6 |
| D. 246,071 | 10/1977 | Landell et al. | D87/1 |
| D. 246,139 | 10/1977 | Landell et al. | D87/1 |
| D. 284,422 | 7/1986 | Pomaville | D3/38 |
| D. 308,915 | 7/1990 | Lanius | D3/38 |
| D. 322,164 | 12/1991 | Hanna et al. | D3/30.1 |
| D. 325,672 | 4/1992 | Baker | D3/38 |
| D. 328,818 | 8/1992 | Hanna et al. | D3/78 |
| D. 328,819 | 8/1992 | Hanna et al. | D3/78 |
| 476,598 | 6/1892 | Bancroft | 190/109 |
| 698,558 | 4/1902 | Rosenbaum | 190/111 |
| 1,495,046 | 5/1924 | Spiegel | 190/111 |
| 1,882,756 | 10/1932 | Boynton | |
| 1,987,822 | 11/1935 | Gregory | 206/373 |
| 2,078,557 | 4/1937 | Bjorkman | 190/109 |
| 2,187,445 | 1/1940 | Botelho | 190/108 |
| 2,299,375 | 10/1942 | Bruske | 43/41 |
| 2,673,783 | 3/1954 | Rahm et al. | 312/312 |
| 2,723,175 | 11/1955 | Berry | 312/269 |
| 2,936,066 | 5/1960 | Meksula | 206/16 |
| 3,047,349 | 7/1962 | Powell | 312/287 |
| 3,050,356 | 8/1962 | Messmer | 312/201 |
| 3,182,872 | 5/1965 | Brosseau | 224/5 |
| 3,251,638 | 5/1966 | Schwartz | 312/244 |
| 3,301,619 | 1/1967 | Mead | 312/200 |
| 3,310,905 | 3/1967 | Davis et al. | 43/57.5 |
| 3,317,097 | 5/1967 | Giordano | 220/522 |
| 3,330,608 | 7/1967 | Druger | 312/111 |
| 3,346,733 | 10/1967 | Woolworth | 240/6.4 |
| 3,399,939 | 9/1968 | Anderson | 312/216 |
| 3,410,018 | 11/1968 | Woolworth | 312/26 |
| 3,481,066 | 12/1969 | Woolworth | 43/57.5 |
| 3,490,169 | 1/1970 | Tweed | 43/57.5 |
| 3,493,102 | 2/1970 | Belokin | 206/16 |
| 3,600,840 | 8/1971 | Meyer | 43/57.5 |
| 3,606,005 | 9/1971 | Meksula | 206/16 R |
| 3,606,511 | 9/1971 | Henning et al. | 312/266 |
| 3,628,843 | 12/1971 | Wynne et al. | 312/294 |
| 3,948,579 | 4/1976 | Schirmer | 312/111 |
| 3,967,869 | 7/1976 | Jackson | 312/270 |
| 3,985,409 | 10/1976 | Kneier | 312/271 |
| 4,023,304 | 5/1977 | Singer | 43/54.5 |
| 4,085,987 | 4/1978 | Vartdal | 312/269 |

(List continued on next page.)

OTHER PUBLICATIONS

Pp. 2–5, Tackle Boxes; Woodstream Ekco Canada, Inc., P.O. Box 210, Niagara Falls, Ontario L2E 6T3. Publication Date 1992.

Pp. 4–10 and 14–17, Tackle Boxes; Plano Molding Company, 431 E. South St., Plano, Ill. 60545-1601. Publication Date 1991.

Catalog Page, Tackle Boxes; Flambeau Products Corporation, 15981 Valplast Road., Middlefield, Ohio 44062. Publication Date 1991.

*Primary Examiner*—David T. Fidei
*Attorney, Agent, or Firm*—Richard B. O'Planick; Lisa B. Riedesel

[57] ABSTRACT

A portable container is disclosed with a pivotal compartment which may be accessed when a cover of the portable container is in an open and a closed position. The compartment is pivotally secured to a side section of the container bottom. The interior of the pivotal compartment may be accessed through a top and bottom wall of the cover section.

14 Claims, 5 Drawing Sheets

U.S. PATENT DOCUMENTS

| | | | |
|---|---|---|---|
| 4,118,086 | 10/1978 | Kneier | 312/270 |
| 4,139,096 | 2/1979 | Sieger | 206/315 |
| 4,240,222 | 12/1980 | Covington | 43/57.5 |
| 4,245,422 | 1/1981 | Souza | 43/57.5 |
| 4,303,158 | 12/1981 | Perkins | 206/373 |
| 4,474,291 | 10/1984 | Fortson | 206/315.11 |
| 4,589,546 | 5/1986 | Sunderland | 206/315.11 |
| 4,691,470 | 9/1987 | Landell et al. | 43/55 |
| 4,729,474 | 3/1988 | Lanius et al. | 206/315.11 |
| 4,739,577 | 4/1988 | Lanius | 43/54.1 |
| 4,765,470 | 8/1988 | Curci | 206/315 |
| 4,768,651 | 9/1988 | Lanius | 206/315.11 |
| 4,782,619 | 11/1988 | Richards | 43/54.1 |
| 4,784,304 | 11/1988 | Schweitzer | 224/202 |
| 4,821,751 | 4/1989 | Chen | 206/581 |
| 4,846,346 | 7/1989 | Kime | 206/373 |
| 4,848,588 | 7/1989 | Rasmussen | 206/581 |
| 4,892,241 | 1/1990 | Mavrakis | 224/216 |
| 4,958,730 | 9/1990 | Bunten | 206/315 |
| 4,984,687 | 1/1991 | Hanna et al. | 206/373 |
| 5,238,142 | 8/1993 | Hanna et al. | 220/772 |

CONTAINER HAVING PIVOTAL COMPARTMENT

BACKGROUND OF INVENTION

1. Field of the Invention

The subject invention relates generally to a container having a pivotal compartment, and more specifically, to a tackle box or utility box having a pivotal compartment which is accessible when the tackle box is in an open or closed position.

2. The Prior Art

Containers, tackle and utility boxes are well known consumer products. Many of these containers contain various space saving and time saving features. For example, U.S. Pat. No. 3,493,102 discloses molded fold down trays within the interior of the cover. U.S. Pat. No. 3,606,511 discloses stackable trays for the interior of the container. U.S. Pat. No. 3,050,356 discloses a fishing tackle box having separable sections containing compartments for storing various articles.

Although the above identified tackle and utility boxes of numerous constructions achieve their objectives to varying degrees, there has been a need expressed for a space saving and time saving container having a pivotal compartment which affords a user dual means of accessibility. In fishing boats, which are generally small, it is desired to attain access to certain articles without opening the entire tackle or utility box. It is also desirable to have access to certain articles at all times, regardless of whether the tackle or utility box is in an open or closed position.

SUMMARY OF THE PRESENT INVENTION

The present invention addresses the above described shortcomings in the prior art, by providing a container having a pivotal compartment. Specifically, the container such as a tackle box or utility box overcomes the shortcomings of the currently available containers because the container has a compartment which can be easily accessible when the cover of the container is in either the open or closed position. The invention comprises a generally rectangular bottom pivotally secured to a cover. The cover contains a separate compartment which may be accessible when the cover is in an open or closed position. The cover also has securing means for assisting in the closure of the cover, to help to prevent the undesired opening of the cover, thereby helping to eliminate spilling of articles contained in the compartment.

Accordingly, it is an objective of the present invention to provide a container which has a pivotal compartment which can be accessed when the container cover is in an open or closed position.

It is a further objective of the invention to provide a container in which several articles may be stored in the same compartment and are easily accessible and free from entanglement.

Yet a further objective of the present invention is to provide a container which is durable and inexpensive to manufacture.

Another objective of the present invention is to provide a container which has several sections or compartments for storing articles of varying sizes and shapes.

These, and other objectives, which will be apparent to one skilled in the art, are achieved by a preferred embodiment which is described in detail below and which is illustrated by the accompanying drawings.

DESCRIPTION OF THE ACCOMPANYING DRAWINGS

DESCRIPTION OF THE PREFERRED EMBODIMENT

Figure 1:
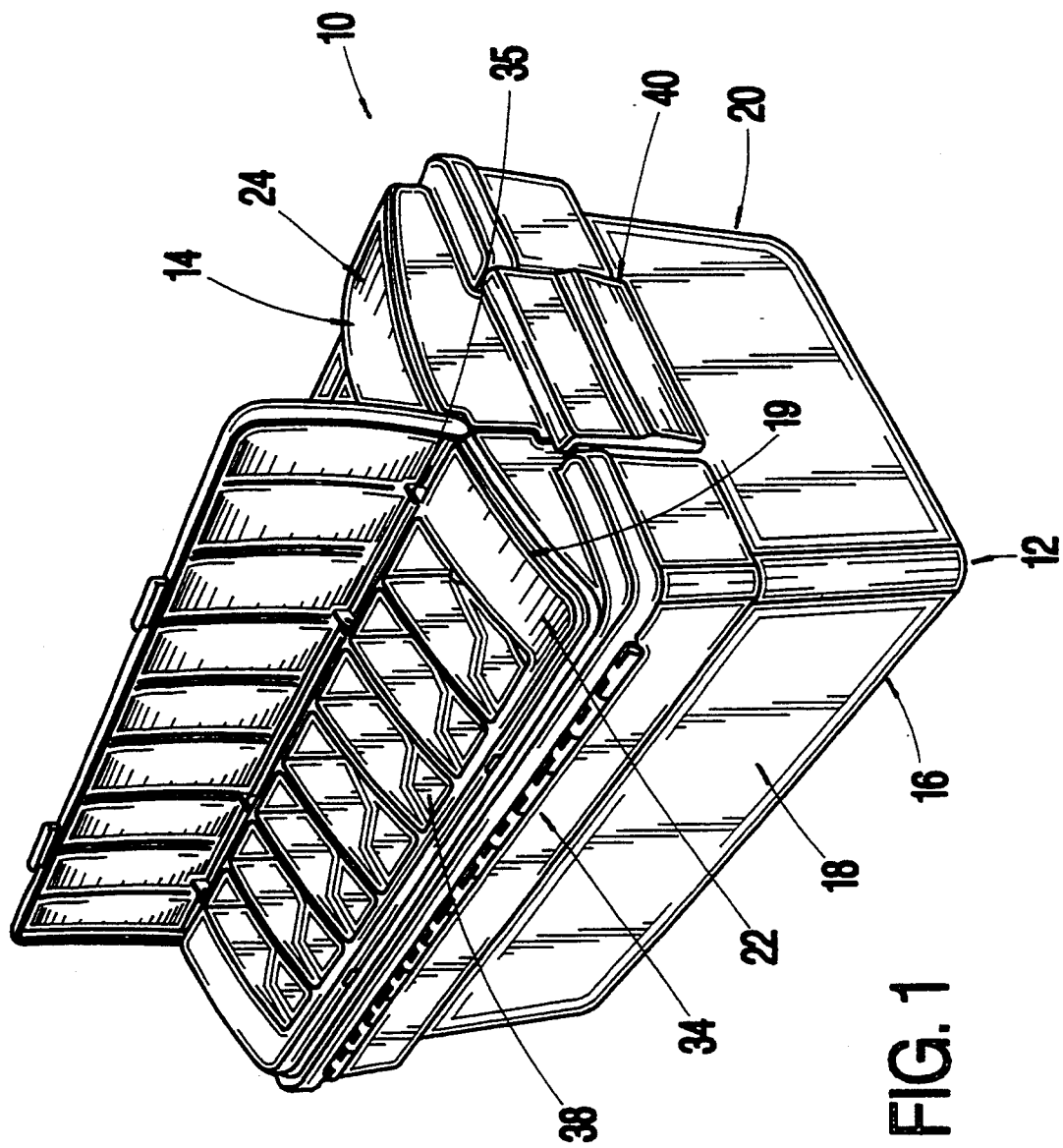
FIG. 1 is a from perspective view of the container having a pivotal compartment, with the top wall in an open position.
Figure 2:
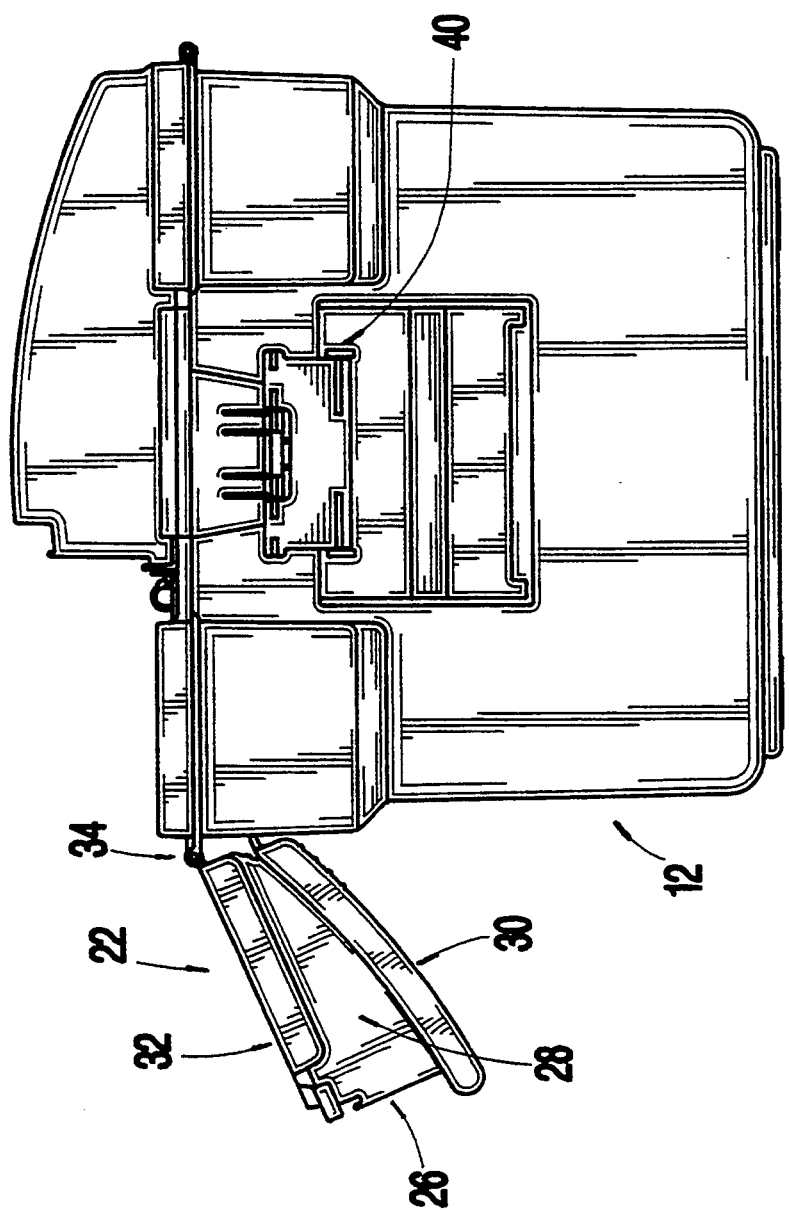
FIG. 2 is an end view of the subject container shown with the cover in an open position.
Figure 3:
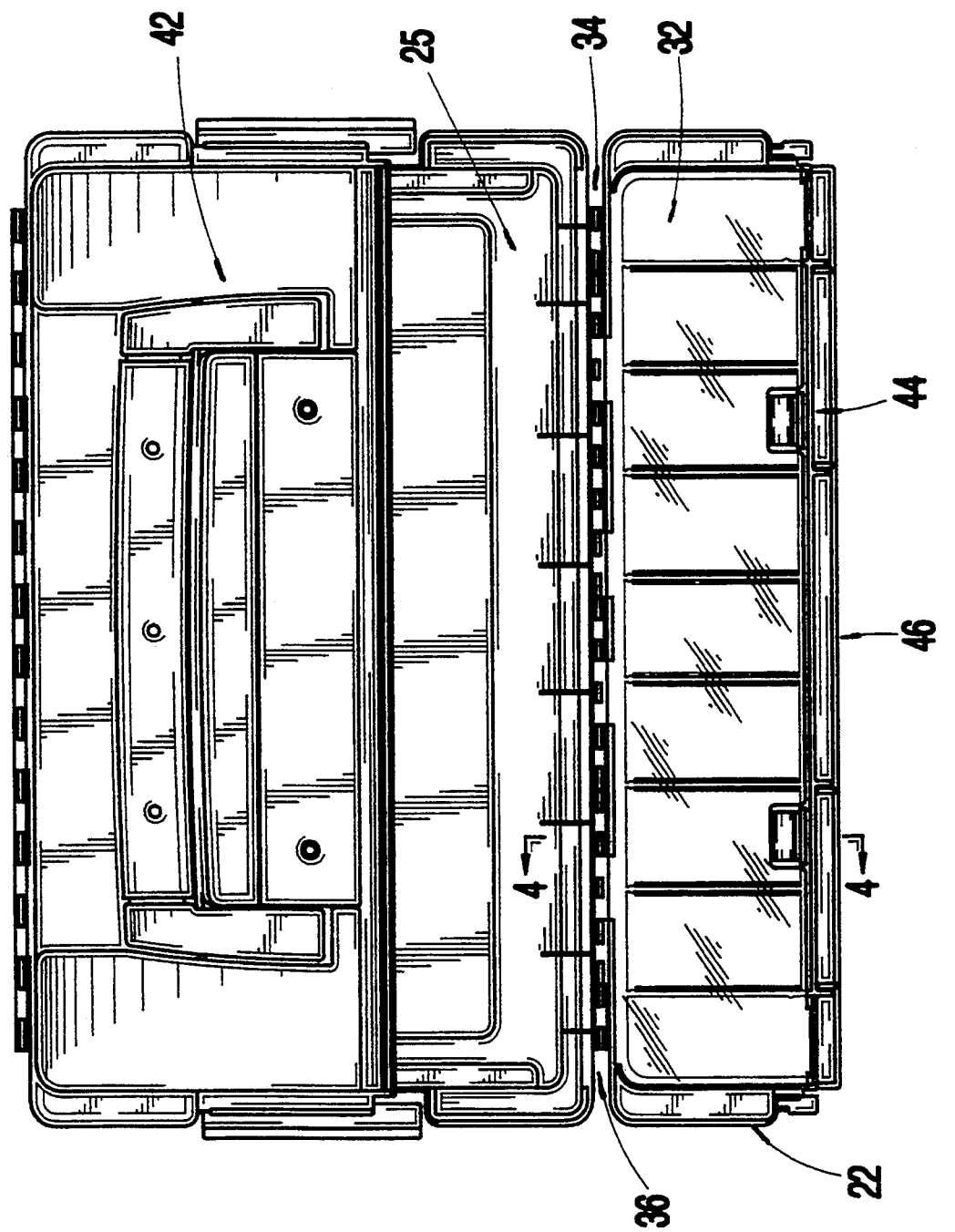
FIG. 3 is a top plan view of the subject container shown with the cover in an open position.

Referring to the figures, FIGS. 1-3 illustrate a tackle or utility box 10 constructed in accordance with the present invention. The tackle box 10 shown is generally box shaped, and comprises a bottom 12, and a cover 14. The bottom 12 comprises a lower section 16, side sections 18, and end sections 20. Generally, the cover 14 may be formed of a similar shape as the bottom 12. The cover 14 may consist of one or additional sections. Specifically, as illustrated in FIGS. 1-2, the cover 14 is formed of two sections 22 and 24. When the cover 14 is in a closed position, and the two cover sections 22 and 24 are adjacent to each other, the cover 14 and bottom 12 coact to form a container interior 25.

Generally, the cover section 22 comprises at least one side wall 26, ends 28, top 30 and bottom wall 32, which define an interior portion 38 of the cover. The cover section 22 is secured to the container bottom 12 by pivotal attaching means 34. The top wall 30 is secured to a side wall 26 by attaching means 35. An upper edge 36 of the bottom side section 18 is pivotally secured to one or both cover sections 22, 24 by a variety of pivotal attaching means 34 such as a piano type hinge as generally shown in FIG. 1. The hinge 34 allows the cover sections 22,24 to easily open and close, thereby defining the container interior 25 and container exterior.

Specifically, the hinge 34 is interposed between an upper edge 36 of the bottom 12 and an edge of the cover bottom wall 32. Therefore, the hinge 34 allows the cover section 22 to pivot between open and closed positions. In addition, the hinge 34 also assists the cover bottom wall 32 to easily alter between an open and closed position. When the cover bottom wall 32 is in an open position, the cover bottom wall 32 will pivot to an approximately horizontal position with respect to the container lower section 16. This allows a user to obtain articles from the cover interior 35 without continuing to physically hold the cover bottom wall 32.

The attaching means 35 for attaching an edge of the cover top wall 30 to the cover side wall 26 is illustrated in FIG. 1. Various types of attaching means can be utilized to ensure that the cover top wall 30 can easily open and remain open without the user continuing to physically hold the cover top wall 30, thereby allowing the user to obtain articles from the cover interior 35. When the cover top wall 30 is in an open position, the cover top wall 30 is orientated approximately vertical with respect to the container lower section 16. FIG. 1 also illustrates the cover bottom wall 32 in a closed position, which helps to ensure that articles placed within the cover interior 35 remain secure.

The cover 14 and bottom 12 can be secured together by various types of latching and securing means 40 (only one is shown). A handle 42 is secured to at least one of the cover sections 22, 24 and allows the user to carry or transport the container 10. In addition, the handle 42 also assists in altering the position of the cover 14 from an open to a closed position. FIG. 1 also illustrates the cover top wall 30 in an open position, revealing the cover interior 38.

FIG. 2 illustrates the container 10, and the cover 22 being moved downwardly and outwardly on its hinge 34, thereby depicting the container 10 partially open and uncovered. The cover top wall 30 and bottom wall 32 are in their closed positions, thereby securing articles retained within the cover interior 38. Thus, when access is desired to the cover interior 35, either the cover top wall 30 or cover bottom wall 32 may be opened. The cover top wall 30 and bottom wall 32 can each be opened by disengaging the securing means, which are adjacent to the edges of the top 30 and bottom 32 walls. The securing means such as tabs 44, 45 help to ensure that the cover 14 can occupy a closed position. In addition, the tabs 44,45 or other securing means also help to prevent the undesired opening of the top wall 30 when the cover section 22 is occupying an open position.

Figure 4:
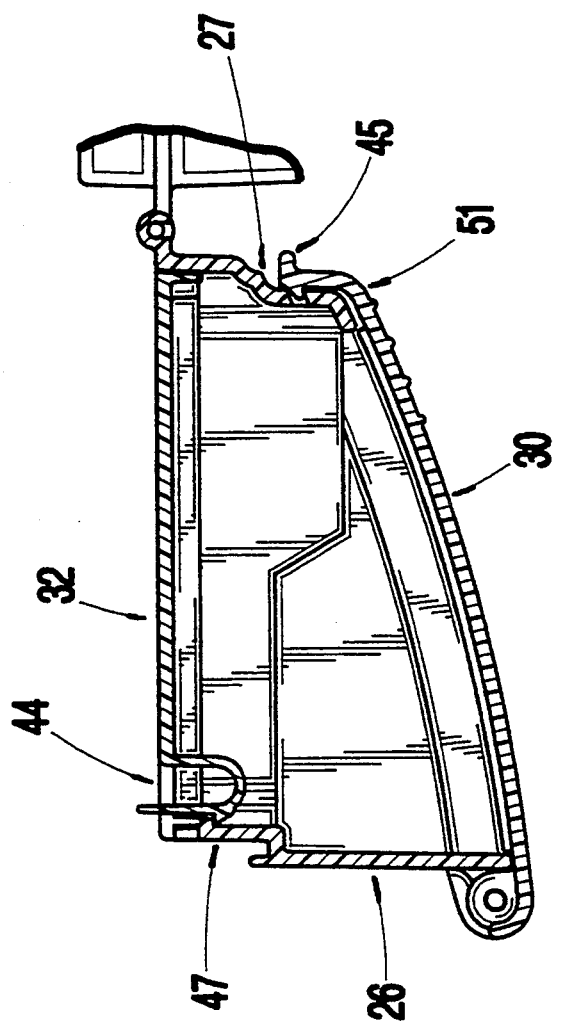
FIG. 4 is a partial exploded cross sectional view of FIG. 3 along the lines 4—4.

Specifically as illustrated in FIGS. 3–4, the bottom wall tabs 44 are located on an outer edge 46 of the cover bottom wall 32. The tab 44 may engage with a lip 47 on the cover side wall 26. When the tab 44 and lip 47 are engaged, it is not possible to open the cover bottom wall 32. In order to open the cover bottom wall 32 and obtain access to the cover interior 38, it is necessary to disengage the tab 44 and lip 47 by depressing and lifting on the tab 44. The placement of the tabs 44 on the outer edge 46 of the cover bottom wall 32 allows the user to easily access the cover interior 38 and the container interior 25.

The securing means existing between the cover top wall 30 and the cover side wall 26 may be of a similar or different type than the securing means described above. As illustrated in FIG. 4, the tabs 45 are located on the outer edge 51 of the cover top wall 30. The tabs 45 may engage with lips or apertures on a side wall 27 to help prevent the undesired opening of the cover top wall 30. It should be noted that various types of securing means other than tabs 44, 45 may be used to help prevent the undesired opening of the cover top 30 and bottom 32 wall.

FIG. 3 also illustrates the container cover section 22 in an open position. The bottom wall 32 and top wall 30 are occupying closed positions, thereby helping to ensure that articles remain secured within the cover section 22. A compartmentalized tray, as illustrated in FIG. 1, may be received in the cover interior 38, and provide enhanced organization to the cover section 22 and container 10. The compartmentalized tray may hold a variety of articles including lures, flies, and the like.

When access to the container interior 25 is desired, it is necessary for either one or both of the cover sections 22 and 24 to be disposed in an approximately horizontal position, as shown generally in FIGS. 2–4. The container interior 25 may be utilized for storing a variety of articles.

FIG. 4 is a partial cross section of FIG. 3. Specifically, FIG. 4 illustrates both the cover top wall 30 and bottom wall 32 occupying closed positions. The top wall 30 and bottom wall 32 may be opened by engaging, pressing and/or lifting the securing means such as the tabs 44,45, thereby accessing the articles within the compartmentalized tray 49. In order to ensure that the articles placed within the compartmentalized tray 49 remain secured within the cover section 22, at least one of the walls 30 or 32 must be in a closed position at all times. Although tabs 44,45 are illustrated in the figures, any type of temporary closure or securing means may be utilized to secure the top 30 and bottom 32 wall in closed positions.

Figure 5:
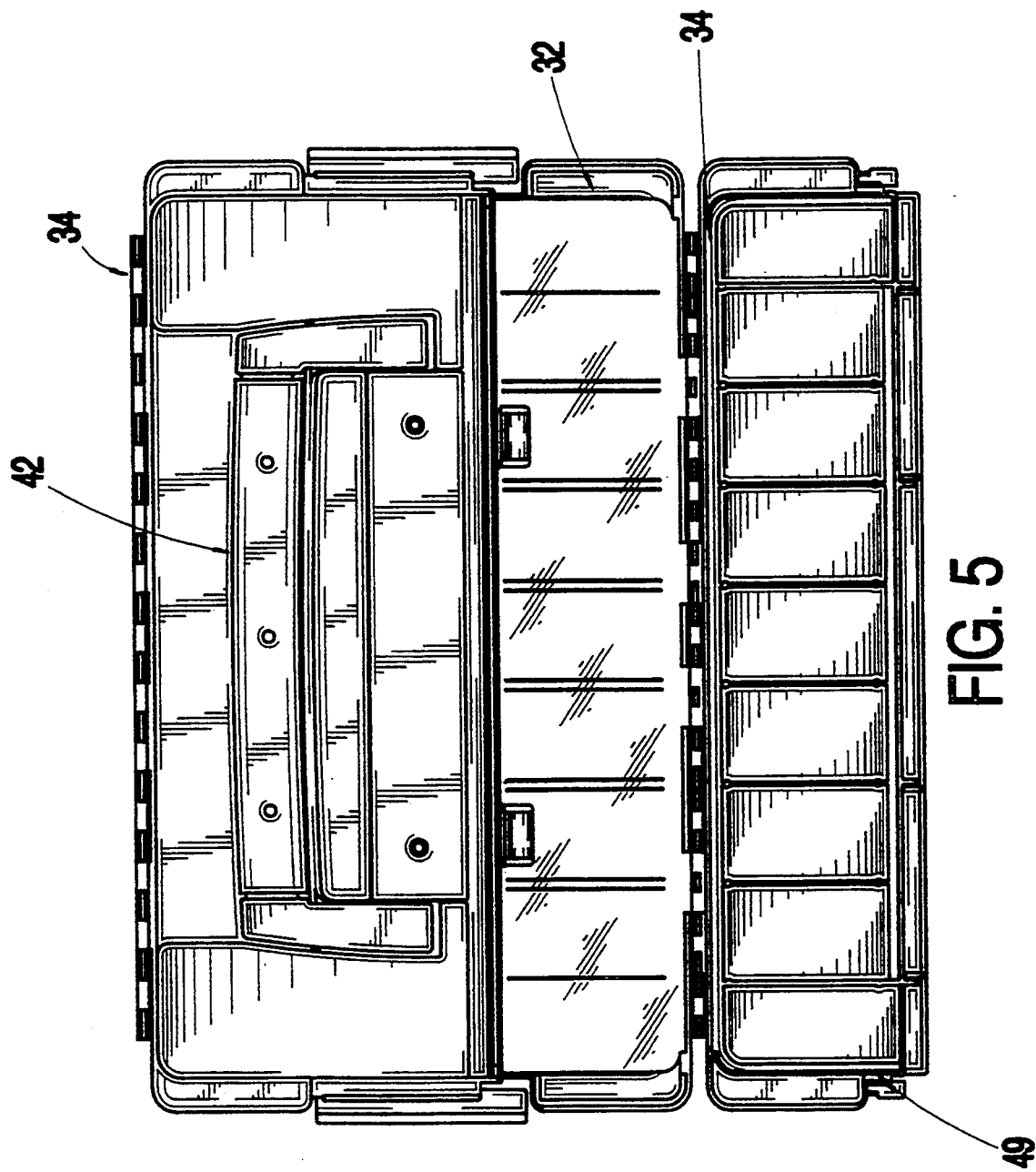
FIG. 5 is a top plan view of the subject invention with the cover section and bottom wall in open positions.

FIG. 5 illustrates the bottom wall 32 in an open position revealing the tray 49 or the cover interior 38 with a form of separating means. The tab 44 and lip 47 have been disengaged, thereby allowing the bottom wall 32 to occupy an open position. When opened, the bottom wall 32 will exist in an approximately horizontal position with respect to the lower section 16. The open bottom wall 32 allows the user access to the cover interior 38.

While the above describes the preferred embodiment, the subject invention is not to be so restricted. Other embodiments, which will be apparent to those skilled in the art, and which utilize the teachings herein set forth, are intended to be within the scope and spirit of the present invention.

We claim:

1. A portable container comprising a bottom section secured to four side sections, and at least one cover section, said cover section pivotally secured to one of said side sections, said cover section comprising one interior portion defined by a top wall, bottom wall and sidewalls, said interior portion being accessible through said top wall and said bottom wall of said cover section.

2. A portable container comprising a bottom section, four side sections and at least one cover section, said cover section having one interior portion defined by a top wall, bottom all, two side walls and at least one end wall, said bottom wall and said cover section hingedly secured to one of said side sections, said interior portion accessible through said top wall and said bottom wall.

3. A portable container according to claim 1, said interior portion of said cover section being accessible when said cover section is in an open position and when said cover section is in a closed position.

4. A portable container according to claim 1, said bottom wall of said cover section pivotally secured to one of said side sections and said cover section.

5. A portable container according to claim 1, said cover section interior portion further comprising a compartmentalized tray accessible through said top wall and said bottom wall of said cover section.

6. A portable container according to claim 1, said container further comprising locking means for securing closed said portable container.

7. A portable container according to claim 1, said container further comprising locking means for securing closed adjacent edges of said side section and said cover section.

8. A portable container according to claim 6, said locking means interposed between at least one of said side sections and said cover section.

9. A portable container according to claim 1, said cover section further comprising securing means interposed adjacent to said top wall and said bottom wall for providing and preventing access to said cover section interior.

10. A tackle box comprising, a generally box shaped bottom section and a generally box shaped top section, attaching means for pivotally attaching said top section to said bottom section, said top section having one interior portion, said interior portion being accessible when said top section is in an open and a closed position, said top section further comprising a top wall and a bottom wall, said top wall and said bottom wall providing access to said interior portion of said top section.

11. A tackle box comprising, a generally box shaped bottom section and a generally box shaped top section, attaching means for pivotally attaching said top section to said bottom section, said top section having one interior portion, said interior portion being accessible when said top section is in an open and a closed position, said top section further comprising a top wall and a bottom wall, said top wall and said bottom wall providing access to said interior portion of said top section, said top wall and said bottom wall further comprising securing means for selectively allowing access to said top section interior portion.

12. A tackle box comprising a bottom section, a first and a second cover section, said first and said second cover sections pivotally attached to said bottom section, said first and said second cover sections for selectively opening and closing said bottom section and jointly therewith defining said box, said first cover section including one storage section, said storage section accessible both when said first cover section is occupying an open position and when said first cover section is occupying a closed position.

13. A tackle box comprising:
a bottom section and four side sections defining a bottom interior;
at least one cover section having one cover interior defined by a top wall, bottom wall, side walls, and end walls;
said cover section pivotally secured to an upper edge of at least one of said side sections;
said cover interior accessible when said cover section is occupying an open position and when said cover section is occupying a closed position;
first securing means interposed between at least one of said side walls and said top wall for providing and preventing access to said cover interior;
second securing means interposed between at least one of said side walls and said bottom wall for providing and preventing access to said cover interior; and
locking means interposed between said side sections and said cover section for securing closed said tackle box.

14. A tackle box comprising:
a generally box shaped bottom section defining a bottom interior;
a generally box shaped cover section, said cover section comprising a first section and a second section, said first and said second sections each providing cover to approximately half of said bottom section, said first section comprising a top wall, bottom wall, two side walls, and at least one end wall, said walls defining a cover interior of said first section which is accessible through said top wall and said bottom wall; and
said bottom interior accessible when said first or said second section is occupying an open position.

* * * * *